United States Patent
Fitzgerald et al.

(10) Patent No.: US 7,592,064 B2
(45) Date of Patent: Sep. 22, 2009

(54) HIGHLY REPELLENT CARPET PROTECTANTS

(75) Inventors: Patrick Henry Fitzgerald, Pitman, NJ (US); Andrew Hen Liu, Newark, DE (US); Peter Michael Murphy, Ooltewah, TN (US); Charles L. Strickler, Elkton, MD (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 769 days.

(21) Appl. No.: 10/913,914

(22) Filed: Aug. 6, 2004

(65) Prior Publication Data
US 2005/0009963 A1 Jan. 13, 2005

Related U.S. Application Data

(62) Division of application No. 09/973,101, filed on Oct. 9, 2001, now Pat. No. 6,790,905.

(51) Int. Cl.
| | | |
|---|---|---|
| B32B 3/02 | (2006.01) |
| B32B 5/02 | (2006.01) |
| B32B 27/00 | (2006.01) |
| B32B 27/02 | (2006.01) |
| B32B 27/04 | (2006.01) |
| B32B 27/12 | (2006.01) |
| B32B 27/40 | (2006.01) |
| D03D 27/00 | (2006.01) |
| D04H 11/00 | (2006.01) |
| D05C 17/00 | (2006.01) |
| D02G 3/00 | (2006.01) |
| B05D 3/02 | (2006.01) |
| C08J 3/00 | (2006.01) |
| C08K 3/20 | (2006.01) |
| C08L 75/00 | (2006.01) |

(52) U.S. Cl. .................. 428/394; 427/372.2; 427/385.5; 428/96; 428/319.3; 428/378; 428/423.1; 428/423.5; 442/82; 442/83; 442/88; 442/89; 442/168; 524/591; 524/839; 524/840

(58) Field of Classification Search .................. 524/591, 524/839, 840; 427/372.2, 385.5; 428/96, 428/319.3, 378, 394, 423.1, 423.5; 442/82, 442/83, 88, 89, 94, 168
See application file for complete search history.

(56) References Cited

U.S. PATENT DOCUMENTS

| | | |
|---|---|---|
| 3,468,697 A | 9/1969 | Hunter |
| 4,504,401 A | 3/1985 | Matsuo et al. |
| 4,566,981 A | 1/1986 | Howells |
| 4,595,518 A | 6/1986 | Raynolds et al. |
| 4,668,726 A | 5/1987 | Howells |
| 4,958,039 A | 9/1990 | Pechhold |
| 5,153,046 A | 10/1992 | Murphy |
| 5,410,073 A | 4/1995 | Kirchner |
| 5,411,766 A | 5/1995 | Kirchner |
| 5,414,111 A | 5/1995 | Kirchner |
| 5,453,540 A | 9/1995 | Dams et al. |
| 5,565,564 A | 10/1996 | Kirchner |
| 5,672,651 A | 9/1997 | Smith |
| 5,714,082 A | 2/1998 | Boardman et al. |
| 5,725,789 A | 3/1998 | Huber et al. |
| 5,847,134 A | 12/1998 | May |
| 5,861,365 A | 1/1999 | Colurciello, Jr. et al. |
| 5,910,557 A | 6/1999 | Audenaert et al. |
| 6,075,003 A | 6/2000 | Haq et al. |

FOREIGN PATENT DOCUMENTS

| | | |
|---|---|---|
| DE | 36 07 773 A | 9/1987 |
| EP | 0 458 356 A | 11/1991 |
| EP | 0 866 115 A | 9/1998 |
| WO | WO 97/44375 A | 11/1997 |
| WO | WO 01/10922 A | 2/2001 |

Primary Examiner—Patrick D Niland
(74) Attorney, Agent, or Firm—Nancy S. Mayer

(57) ABSTRACT

Carpet protectants comprising an aqueous dispersion comprising

A. a partially fluorinated urethane polymer having at least one urea linkage, which compound is the product of the reaction of: (1) at least one organic polyisocyanate containing at least three isocyanate groups; (2) at least one fluorochemical compound which contains per molecule (a) a single functional group having one or more Zerewitinoff hydrogen atoms and (b) at least two carbon atoms, each of which is attached to at least two fluorine atoms; and (3) water in an amount sufficient to react with from about 5% to about 60% of the isocyanate groups in said polyisocyanate;

B. a non-fluorinated cationic surfactant; and

C. a non-fluorinated nonionic surfactant are disclosed.

8 Claims, No Drawings

HIGHLY REPELLENT CARPET PROTECTANTS

CROSS-REFERENCE TO RELATED APPLICATION

This application is a divisional of U.S. Ser No. 09/973,101, filed Oct. 9, 2001, now U.S. Pat. No. 6,790,905.

BACKGROUND OF THE INVENTION

Early fluorocarbon carpet protectant treatments were typically formulated within cationic surfactant systems. With the advent of the use of anionic compositions to provide stain resistance in the cationic treatment, the problem of tip staining arose. When a carpet, pretreated with a stain resist, is treated with a cationic or cationically dispersed fluorochemical repellant, sometimes localized staining can occur on areas of the carpet fibers where the fluorochemical repellant has been deposited. In the industry, this is termed tip-staining. Tip staining is believed due to residues of cationic material on the carpet, the residues providing staining sites for acid dyes, such as caused by spills of soft drinks colored with the acid dye FD&C Red No. 40.

To address the tip staining problem anionic surfactant systems were developed and employed for carpet soil resists, but such surfactant systems compromised repellency. Kirchner in U.S. Pat. Nos. 5,414,111 and 5,565,564 has described certain polyfluorourethane compounds for providing oil and water repellent properties to a carpet substrate. When these polyfluorourethane compounds were applied to carpet substrates as aqueous dispersions using anionic surfactants, tip staining was not a problem. However, an ideal carpet protectant would exhibit higher levels of repellency, towards both oily and aqueous soils, than is provided by the existing art. With such higher levels of repellency, the soils fail to wet the fibers, and are thus readily removed.

Thus there is a need for carpet protectant formulations that improve repellency without either causing tip-staining or gelling problems, or detracting from the compatibility of anionic formulations. The present invention provides such formulations.

SUMMARY OF THE INVENTION

The present invention comprises an aqueous dispersion comprising
  A. a partially fluorinated urethane polymer having at least one urea linkage, which compound is the product of the reaction of: (1) at least one organic polyisocyanate containing at least three isocyanate groups; (2) at least one fluorochemical compound which contains per molecule (a) a single functional group having one or more Zerewitinoff hydrogen atoms and (b) at least two carbon atoms, each of which is attached to at least two fluorine atoms; and (3) water in an amount sufficient to react with from about 5% to about 60% of the isocyanate groups in said polyisocyanate;
  B. a non-fluorinated cationic surfactant; and
  C. a non-fluorinated nonionic surfactant.

Such dispersions provide a high level of oil repellency, water repellency and soil resistance when applied to fibrous substrates such as carpets.

The present invention further comprises a method for providing water and oil repellency to a substrate comprising application to the substrate of a dispersion as described above.

The present invention further comprises a substrate treated with a dispersion as described above.

DETAILED DESCRIPTION

Hereinafter trademarks are shown in upper case.

The present invention comprises partially fluorinated urethane polymers dispersed in water using mixtures of cationic and nonionic surfactants. The dispersions of this invention, when applied to carpets, provide improved water repellency, oil repellency, and soil resistance, compared with carpets treated with the dispersions of partially fluorinated urethane polymers utilizing anionic surfactants. Carpet substrates to which the partially fluorinated urethane polymer dispersions of the present invention include carpets containing fibers of nylon, wool, polyester, poly(trimethylene terephthalate), polyolefin, cotton, jute, sisal, and the like, and mixtures thereof. Unexpectedly, some dispersions of the present invention are less prone to gelling in admixture or contamination with some dispersions containing anionic surfactants.

Additionally, the partially fluorinated urethane polymer dispersions of the present invention are substantially free of volatile organic compounds (VOC), containing less than 1% VOC by weight, in contrast with the emulsions of partially fluorinated urethane polymers used in the prior art. VOCs in formulations that are subsequently dried are potential environmental air pollutants. They also contribute to workplace hazards, such as potential flammability and worker exposure concerns, and are thus undesirable.

The partially fluorinated urethane polymers used in the present invention comprise compounds having at least one urea linkage per molecule which compounds are derived from: (1) at least one polyisocyanate or mixture of polyisocyanates which contains at least three isocyanate groups per molecule, (2) at least one fluorochemical compound which contains per molecule (a) a single functional group having one or more Zerewitinoff hydrogen atoms and (b) at least two carbon atoms, each of which is attached to at least two fluorine atoms, and (3) water in an amount sufficient to react with from about 5% to about 60% of the —NCO groups in the polyisocyanate. In a preferred embodiment, the amount of water is sufficient to react with about 10% to about 40% of the isocyanate groups in the polyisocyanate, and most preferably, between about 15% and about 30%.

A Zerewitinoff hydrogen atom is an active hydrogen in an organic compound (in a group such as a —OH, —COOH, =NH, etc. Paul Karrer, in the English Translation of "Organic Chemistry", published by Elsevier, 1938, page 135, provides further details. Such hydrogen atoms are measured using the Zerewitinoff method wherein the organic compound is reacted with a $CH_3Mg$ halide to liberate $CH_4$ which, measured volumetrically, gives a quantitative estimate of the active hydrogen content of the compound. Primary amines give 1 mole of $CH_4$ when reacted in the cold; usually 2 moles when heated. For purposes of this invention, it is assumed that a primary amine provides one active hydrogen as defined by Zerewitinoff et al.

A wide variety of fluorochemical compounds that contain a single functional group can be used so long as each fluorochemical compound contains at least two carbon atoms, and each carbon atom is attached to at least two fluorine atoms. For example, the fluorochemical compound can be represented by the formula:

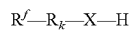

wherein
  $R^f$ is a monovalent aliphatic group containing at least two carbon atoms, each of which is attached to at least two fluorine atoms;
  R is a divalent organic radical;
  k is 0 or 1; and
  X is —O—, —S—, or —N($R^3$) in which $R^3$ is H, alkyl containing 1 to 6 carbon atoms, or a $R^f$—$R_k$— group.

In a more specific embodiment, the fluorochemical compound which contains a single functional group can be represented by the formula:

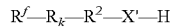

wherein $R^f$ and k are as defined above;
  R is the divalent radical: —$C_mH_{2m}$SO—, —$C_mH_{2m}SO_2$—, —$SO_2N(R^3)$—, or —$CON(R^3)$— in which m is 1 to 22 and $R^3$ is H or alkyl of 1 to 6 carbon atoms;
  $R^2$ is the divalent linear hydrocarbon radical: —$C_nH_{2n}$— which can be optionally end-capped by

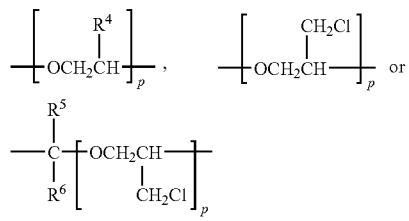

in which n is 0 to 12, p is 1 to 50, and $R^4$, $R^5$ and $R^6$ are the same or different H or alkyl containing 1 to 6 carbon atoms; and
  X' is —O—, —S—, or —N($R^7$)— in which $R^7$ is H, alkyl containing 1 to 6 carbon atoms or a $R^f$—$R_k$—$R^2$— group.

More particularly, $R^f$ is a fully-fluorinated straight or branched aliphatic radical of 3 to 20 carbon atoms.

In a preferred embodiment, the fluorochemical compound which contains a single functional group can be represented by the formula:

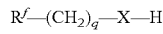

wherein
  X is —O—, —S—, or —N($R^7$)— in which $R^7$ is H, alkyl containing 1 to 6 carbon atoms or a $R^f$—$R_k$—$R^2$— group.
  $R^f$ is a mixture of perfluoroalkyl groups, $CF_3CF_2(CF_2)_r$ in which r is 2 to 18; and
  q is 1, 2 or 3.

In a more particular embodiment, $R^f$ is a mixture of said perfluoroalkyl groups, $CF_3CF_2(CF_2)_r$; and r is 2, 4, 6, 8, 10, 12, 14, 16, and 18. In a preferred embodiment, r is predominantly 4, 6 and 8. In another preferred embodiment, r is predominantly 6 and 8. The former preferred embodiment is more readily available commercially and is therefore less expensive, while the latter may provide improved properties. In a typical mixture of such perfluoroalkyl groups, the compounds will have the following approximate composition in relation to their $CF_3CF_2(CF_2)_r$ groups:
  0% to 3% wherein r=2,
  27% to 37% wherein r=4,
  28% to 32% wherein r=6,
  24% to 20% wherein r=8,
  8% to 13% wherein r=10,
  3% to 6% wherein r=12,
  0% to 2% wherein r=14,
  0% to 1% wherein r=16, and
  0% to 1% wherein r=18.

Representative fluoroaliphatic alcohols that can be used for the purposes of this invention are:

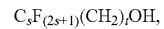

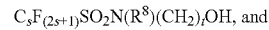

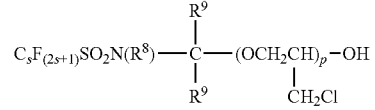

wherein
  s is 3 to 20;
  t is 1 to 12;
  each of $R^8$ and $R^9$ is independently H or alkyl containing 1 to 6 carbon atoms.

In another embodiment of the invention, a nonfluorinated organic compound which contains a single functional group can be used in conjunction with one or more of said fluorochemical compounds. Usually in this embodiment, between about 1% and about 60% of the isocyanate groups of the polyisocyanate are reacted with at least one such nonfluorinated compound. For example, said nonfluorinated compound can be represented by the formula:

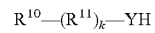

wherein
  $R^{10}$ is a $C_1$-$C_{18}$ alkyl, a $C_1$-$C_{18}$ omega-alkenyl radical or a $C_1$-$C_{18}$ omega-alkenoyl;
  $R^{11}$ is

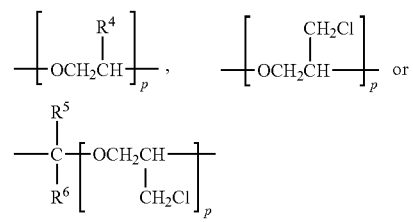

in which $R^4$, $R^5$ and $R^6$ are the same or different H or alkyl radical containing 1 to 6 carbon atoms and p is 1 to 50;
  Y is —O—, —S—, or —N($R^3$)— in which $R^3$ is H or alkyl containing 1 to 6 carbon atoms; and
  k and p are as defined above.

For example, the nonfluorinated compound can be an alkanol or a monoalkyl or monoalkenyl ether of a polyoxyalkylene glycol. Particular examples of such compounds include stearyl alcohol, the monoalkyl ether of polyoxyethylene glycol, the mono-allyl or -methallyl ether of polyoxyethylene glycol, and the like.

Any polyisocyanate having three or more isocyanate groups can be used for the purposes of this invention. For example, one can use hexamethylene diisocyanate homopolymers having the formula:

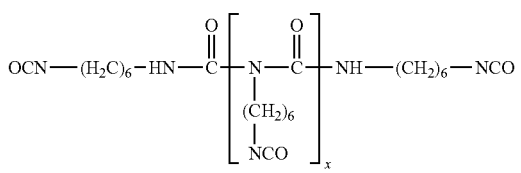

wherein x is an integer equal to or greater than I, preferably between 1 and 8. Because of their commercial availability, mixtures of such hexamethylene diisocyanate homopolymers are preferred for purposes of this invention. Also of interest are hydrocarbon diisocyanate-derived isocyanurate trimers that can be represented by the formula:

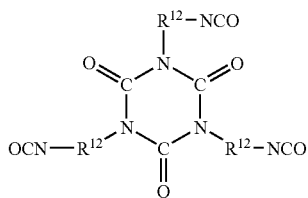

wherein $R^{12}$ is a divalent hydrocarbon group, preferably aliphatic, alicyclic, aromatic or arylaliphatic. For example, $R^{12}$ can be hexamethylene, toluene or cyclohexylene, preferably the first. Other polyisocyanates useful for the purposes of this invention are those obtained by reacting three moles of toluene diisocyanate with I,I,I-tris-(hydroxymethyl)-ethane or I,I,I-tris(hydroxymethyl)-propane. The isocyanurate trimer of toluene diisocyanate and that of 3-isocyanatomethyl-3,4,4-trimethylcyclohexyl isocyanate are other examples of polyisocyanates useful for the purposes of this invention, as is methine-tris-(phenylisocyanate). Also useful for the purposes of this invention is the polyisocyanate having the formula:

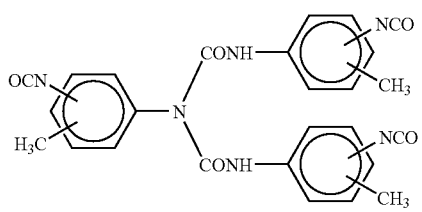

The partially fluorinated urethane polymers of the invention are prepared by reacting: (1) at least one polyisocyanate or mixture of polyisocyanates which contains at least three isocyanate groups per molecule with (2) at least one fluorochemical compound which contains per molecule (a) a single functional group having one or more Zerewitinoff hydrogen atoms and (b) at least two carbon atoms, each of which is attached to at least two fluorine atoms. Thereafter the remaining isocyanate groups are reacted with water to form one or more urea linkages. Usually between about 40% and about 95% of the isocyanate groups will have been reacted before water is reacted with the polyisocyanate. In other words, the amount of water generally is sufficient to react with from about 5% to about 60% of the isocyanate groups in the polyisocyanate. Preferably, between about 60% and about 90% of the isocyanate groups have been reacted before water is reacted with the polyisocyanate, and most preferably between about 70% and about 85% of the isocyanate groups have been reacted prior to reaction of water with the polyisocyanate. Thus, in a preferred embodiment the amount of water is sufficient to react with about 10% to about 40% of the isocyanate groups, most preferably between about 15% and about 30%.

In one embodiment, water-modified fluorochemical carbamates have been prepared by the sequential catalyzed reaction of DESMODUR N-100, DESMODUR N-3200 or DESMODUR N-3300, or mixtures thereof, with a stoichiometric deficiency of a fluoroalkyl compound containing one functional group, and then with water. DESMODUR N-100 and DESMODUR N-3200 are hexamethylene diisocyanate homopolymers commercially available from Bayer Corporation (Pittsburgh, Pa.). Both presumably are prepared by the process described in U.S. Pat. No. 3,124,605 and presumably to give mixtures of the mono-, bis-, tris-, tetra- and higher order derivatives which can be represented by the general formula:

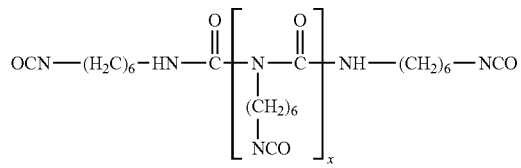

wherein x is an integer equal to or greater than I, preferably between 1 and 8.

| Typical Properties | Average Equivalent Weight | NCO Content, % |
|---|---|---|
| DESMODUR N-100 | 191 | 22.0 |
| DESMODUR N-3200 | 181 | 23.2 |

The typical —NCO content of DESMODUR N-100 approximates that listed for a SRI International Report (Isocyanates No. ID, July, 1983, Page 279) hexamethylene diisocyanate homopolymer with the following composition:

| Product Composition | Weight % |
|---|---|
| Hexamethylene diisocyanate | 0.1 |
| Monobiuret | 44.5 |
| Bisbiuret | 17.4 |
| Trisbiuret | 9.5 |
| Tetrabiuret | 5.4 |
| Higher Mol. Wt. Derivatives | 23.1 |
| NCO Content | 21.8 |

Based on its average equivalent weight and NCO content, the comparative bis-, tris-, tetra-, etc., content of DESMODUR N-3200 should be less than that of the N-100 product. DESMODUR N-3300 is a hexamethylene diisocyanate-derived isocyanurate trimer, which can be represented by the formula:

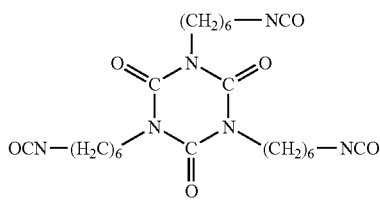

The water-modified partially fluorinated urethane polymers are typically prepared by first charging the polyisocyanate, the fluoroalkyl compound and a dry organic solvent such as methylisobutylketone (MIBK) to a reaction vessel. The order of reagent addition is not critical. The specific weight of aliphatic polyisocyanate and fluoroalkyl compounds charged is based on their equivalent weights and on the working capacity of the reaction vessel and is adjusted so that all Zerewitinoff active hydrogens charged will react with some desired value between about 40% and about 95% of the total NCO groups charged. The weight of dry solvent is typically between about 15% and about 30% of the total charge weight. The charge is agitated under nitrogen and heated to 40°-70° C. A catalyst, typically dibutyltindilaurate per se, or as a solution in methylisobutylketone (MIBK), is added in an amount which depends on the charge, but is usually small, e.g. 1 part per 2000 to 3000 parts of the polyisocyanate. After the resultant exotherm, the mixture is agitated at a temperature between about 65° and about 105° C. for 2-20 hours from the time of the catalyst addition. Then, after its temperature is adjusted to between about 55° and about 90° C., the mixture is treated with water per se or with wet MIBK for an additional 1 to 20 hours. The resultant product is converted to a surfactant-stabilized dispersion.

The partially fluorinated urethane polymers, dissolved or dispersed in hot solvent are emulsified in water using surfactants, using equipment such as a sonnicator, homogenizer, microfluidizer, high shear blending equipment and the like. The emulsion is cooled and the solvent stripped off by distillation to form the aqueous dispersion. The dispersion is prepared using mixtures of cationic and nonionic surfactants.

Suitable cationic surfactants for the practice of the present invention are listed below, under three categories. Specific examples and preferred examples of cationic surfactants are listed, but the practice of this invention is not limited to the specific cited surfactants, which are provided only as examples.

Category 1 comprises salts of protonated amines. The acids with which these amines can be protonated to form ammonium salts include, but are not limited to, hydrochloric and acetic (hereinafter abbreviated as HOAC) acids. Preferred cationic surfactants are alkyl dimethyl amines (e.g., ARMEEN DM12D/HOAc and preferably ARMEEN DM18D/HOAc), dialkyl methyl amines, alkyl ethoxylated amines, alkyl diamines and their ethoxylates.

Category 2 comprises quaternary ammonium salts. Such quaternary ammonium salts are typically produced by alkylation of amines, including those listed above. Alkylating agents frequently include, but are not limited to, methyl chloride, dimethyl sulfate, diethyl sulfate, and benzyl chloride. Additional useful cationic surfactants are alkyl trimethyl ammonium salts (such as ARQUAD 12-50, ARQUAD 16-50, ARQUAD 18-50, and ARQUAD C-50); dialkyl dimethyl ammonium salts (such as ARQUAD HTL8 (W) MS-85 and the preferred ARQUAD 2C-75 and ARQUAD 2HT-75), specifically dialkyl dimethyl ammonium chloride; alkyl methyl ethoxylated ammonium (such as ETHOQUAD C/25 and ETHOQUAD 18/25); alkyl dimethyl benzyl ammonium; dialkyl methyl benzyl ammonium; alkyl, alkylamidomethyl, and carboalkoxy pyridinium (with and without ring substitution); alkyl quinolinium; alkyl isoquinolinium; N,N-alkyl methyl pyrollidinium; amidoimidazolinium; amido ammonium; and quaternary ammonium salts of alkyl diamines and their ethoxylates.

Category 3 comprises alkyl dimethyl amine oxide, dialkyl methyl amine oxide, and alkyl diamine oxide.

Thus the cationic surfactant of any category is typically selected from the group consisting of at least one of a protonated alkyl dimethyl amine salt, protonated dialkyl methyl amine salt, protonated alkyl ethoxylated amine salt, protonated alkyl diamine salt, protonated alkyl ethoxylated diamine salt, alkyl trimethyl ammonium salt, dialkyl dimethyl ammonium salt, alkyl methyl ethoxylated ammonium salt, alkyl dimethyl benzyl ammonium salt, dialkyl methyl benzyl ammonium salt, alkyl pyridinium salt, alkylamidomethyl pyridinium salt, carboalkoxy pyridinium salt, alkyl quinolinium salt, alkyl isoquinolinium salt, N,N-alkyl methyl pyrollidinium salt, amidoimidazolium salt, and amido ammonium salt. Alternatively the cationic surfactant is selected from a quaternary ammonium salt of alkyl diamine, ethoxylate of quaternary ammonium salt of alkyl diamine, alkyl dimethyl amine oxide, dialkyl methylamine oxide, and alkyl diamine oxide.

Suitable nonionic surfactants for the practice of the present invention are ethylene oxide condensates. Examples of types of such ethylene oxide condensates include condensates with esters of fatty acids and polyhydric alcohols (such as sorbitan esters, e.g., TWEEN 80); with fatty acid alkanol amides (such as amides of fatty acids and diethanol amine, e.g., AMIDOX C-5); with alkyl phenols (such as isooctylphenol, e.g., IGEPAL CA-720); with a fatty acid (such as a stearate, e.g., MAPEG 60OMS); with a linear fatty alcohol (such as MERPOL HCS, BRIJ 35, BRIJ 56, BRIJ 58, BRIJ 76, or BRIJ 700); with a branched fatty alcohol (such as MERPOL SE or TERGITOL 15-S-15); and with poly(oxypropylene) block-copolymers (such as PLURONIC L81). More preferred are nonionic surfactants having the structure of Formula A $$C_xH_{(2x+1)}O-(CH_2CH_2O)_n-H \qquad \text{Formula A}$$

wherein x is 12 to 18 and n is 5 to 100. Most preferred are polyethoxylated linear alcohols.

The above listed surfactants are commercially available from the following sources. AMIDOX C-5 and WAQE are products of the Stepan Company (Northfield, Ill.). ARMEEN, ETHOQUAD, and ARQUAD products were obtained from Akzo Nobel (Chicago, Ill.). DESMODUR N-100, N-3200, and N-3300 are described above and are available from Bayer Corporation (Pittsburgh, Pa.). IGEPAL CA-720 may be obtained form the Aldrich Chemical Company (Milwaukee, Wis.). MAPEG 600MS is a product of Mazer Chemicals, Inc. (Gurnee, Ill.). MERPOL HCS and MERPOL SE are products of E. I. du Pont de Nemours and Co. (Wilmington, Del.). PLURONIC L81 is a product of BASF Corporation (Mt. Olive, N.J.). TERGITOL 15-S-15 is a product of Dow Chemical Company (Midland, Mich. ). BRIJ and TWEEN products are from ICI Americas Inc. (Bridgewater, N.J.).

Most quaternary ammonium salts exhibit antimicrobial properties. They are effective agents against a variety of bacteria, fungi, and viruses, while presenting a low order of human toxicity. Thus the use of quaternary ammonium salts in the practice of this invention can eliminate the need for added antimicrobials for dispersion stability and storage.

The amount of surfactant or surfactants, by weight and based on the amount of the partially fluorinated urethane polymer, is from about 1% to about 12% and preferably from about 1% to about 5% of the cationic surfactant, and from about 0.5% to about 12%, and preferably from about 0.5% to about 3% of the nonionic surfactant. Thus the preferred total surfactant is from about 1.5% to about 8%, based on the weight of partially fluorinated urethane polymer.

The concentration of the partially fluorinated urethane polymer dispersion is adjusted and applied at a wet pick up rate sufficient to provide from about 100 to about 2000 micrograms, and preferably from about 200 to about 800 micrograms fluorine per gram of dry fiber substrate to which it is applied. The goal fluorine level (micrograms of fluorine per gram of carpet fiber pile) is the product of (1) the application rate of the partially fluorinated polyurethane emulsion onto the carpet pile and (2) the fluorine weight concentration of the partially fluorinated polyurethane emulsion. The application rate (1) of the partially fluorinated polyurethane emulsion onto the carpet pile is the product of (a) wet pick up of the application bath of the partially fluorinated polyurethane emulsion in water based on the face weight of the carpet, and (b) the concentration by weight of the partially fluorinated polyurethane emulsion in water.

The present invention further comprises a method for providing water repellency and oil repellency to a substrate comprising application to the substrate of a dispersion as described above. The aqueous dispersion formulations of the present invention can be applied to suitable substrates by a variety of methods. Examples of such methods include, but are not limited to, beck dying procedures, continuous dyeing procedures, thread-line applications, brushing, dipping, spraying, padding, roll-coating, foaming or the like. The aqueous dispersion formulations of this invention can be applied to the substrate as such or in combination with other textile or fluorofinishes, stainblockers, processing aids, lubricants, anti-stains, etc. The formulations can also be blended with other agents that have oil/water repellency and soil release properties and applied to fibers or fabrics. They can be applied to dyed and undyed carpeting and other textile substrates.

In carpet mills, different chemicals often share common supply lines and mixing equipment, if only briefly. Compatibility between the various antistatic agents, antimicrobial agents, stainblockers, fluorochemicals, and other chemical treatments for carpet protection simplifies the carpet manufacturing process and chemical application equipment. The overall compatibility of fluorochemical protectants is a measure of how many different antistatic agents, antimicrobial agents, stainblockers, fluorochemicals, and other chemical treatments for carpet protection are compatible with the fluorochemical protectant. Most anionic emulsions and dispersions are incompatible with most cationic emulsions and dispersions. An incompatibility between two emulsions or dispersions can be observed as separation or coagulation of the mixture of chemical treatments. One of the advantages of the compositions of the present invention is the compatibility with a wide variety of carpet treatment chemicals.

A wide range of stain resists and soil resists are suitable for use in the practice of the present invention. Suitable stain resists are polymers containing phenol-formaldehyde, methacrylic acid, maleic acid, sulfonated fatty acids, and blends of the above. Suitable soil resists are polymers containing fluorochemical residues with the most preferred being cationically dispersed. The use of cationic fluorochemicals in combination with anionic stain resists typically gives better fluorine retention. Suitable stain resists for the practice of this invention include, but are not limited to, phenol formaldehyde polymers or copolymers such as CEASESTAIN and STAINAWAY (from American Emulsions Company, Inc., Dalton, Ga.), MESITOL (from Bayer Corporation, Pittsburgh, Pa.), ERIONAL (from Ciba Corporation, Greensboro, N.C.), INTRATEX (from Crompton & Knowles Colors, Inc., Charlotte, N.C.), STAINKLEER (from Dyetech, Inc., Dalton, Ga.), LANOSTAIN (from Lenmar Chemical Corporation, Dalton, Ga.), and SR-300, SR-400, and SR-500 (from E. I. du Pont de Nemours and Company, Wilmington, Del.); polymers of methacrylic acid such as the SCOTCHGARD FX series carpet protectors (from 3M Company, St. Paul, Minn.); and sulfonated fatty acids from Rockland React-Rite, Inc., Rockmart, Ga.). Suitable soil resists for the practice of the present invention include, but are not limited to, fluorochemical emulsions such as AMGUARD (from American Emulsions Company, Inc., Dalton, Ga.), SOFTECH (from Dyetech, Inc., Dalton, Ga.), LANAPOL (from Lenmar Chemical Corporation, Dalton, Ga.), SCOTCHGARD FC series carpet protectors (from 3M Company, St. Paul, Minn.), NK GUARD (from Nicca U.S.A, Inc., Fountain Head, N.C.), UNIDYNE (from Diakin America, Inc., Decatur, Ala.), and ZONYL 555, N-130 and N-119 (from E. I. du Pont de Nemours and Company, Wilmington, Del.).

The present invention further comprises a substrate having a coating on its surface of a dispersion as described above. Suitable substrates for the application of the products of this invention are fibrous substrates such as carpets, rugs, and the yarns and fibers used to make such carpets and rugs. Specific representative examples include dyed and undyed yarns and fibers containing fibers of nylon, wool, polyester, poly(trimethylene terephthalate), polyolefin, cotton, jute, sisal, and the like, and mixtures thereof. Such substrates are especially suitable for treatment with the compositions of this invention to provide products having a high repellency to oil and water. The treated substrates are also relatively unaffected by the action of heat, air and light. Materials rendered oil and water-repellent by the products of this invention retain a high portion of the original repellency after cleaning. The partially fluorinated urethane polymers of this invention impart oil-, water-, and soil-repellency properties to fibrous substrates.

Two types of substrates are of particular interest in accordance with the present invention. One of those is carpeting, particularly nylon carpeting, to which compounds of the present invention are applied so as to impart oil-, water- and soil-repellency. The other class of substrates to which it is particularly advantageous to apply the compounds of the present invention so as to impart soil-release properties includes those prepared from polyamide fibers (such as nylon), cotton and blends of polyester and cotton. Of particular interest is polyamide carpeting, e.g. nylon carpeting.

Test Methods

The following Test methods were employed in the Examples.

Test Method 1: Soiling Evaluation

Materials:

The following materials are used. U.S. Stoneware BURUNDUM cylinders was from VWR Scientific Products, South Plainfield N.J. (small cylinders 1.2 cm diameter, 1.2 cm height and medium cylinders 2 cm diameter, 2 cm height). Cylindrical extruded ZYTEL nylon-6,6 pellets 0.2 cm diameter, 0.3 cm height was from E. I. du Pont de Nemours and Co., Wilmington, Del. AATCC standard soil is available from American Association of Textile Chemists and Colorists, Research Triangle Park, N.C. Soiled nylon pellets were prepared by combining 3 g of AATCC standard soil and 1000 g of ZYTEL nylon-6,6 pellets in a container and tumble mixing for 20 minutes to insure a homogeneous coating of soil on the pellets.

Equipment:

The following equipment is used. Vetterman drums are available from A. Schonberg Gmbh & Co., Am Sportplatz, Germany, and the Vetterman drum operation is described in ISO test method TR-10361. The calorimeter for measuring the visual change in soiling is manufactured by Minolta Corp., Ramsey, N.J. The vacuum cleaner is a Hoover "Preferred" upright model type "A", 110 Volt, 7.2 amp from Maytag Corporation, Newton, Iowa.

Procedure:

To perform the soiling test, the carpet samples were placed in the Vetterman drum. 1200 g of small, and 600 g of medium, BURUNDUM cylinders were added to the drum, together with 200 g of fresh nylon pellets and 100 g of soiled nylon pellets, and the opening in the face of the Vetterman drum was closed with a PLEXIGLASS cover. The Vetterman drum was operated for 500 revolutions, after which the BURUNDUM cylinders and the dirty nylon pellets were removed. The carpet samples were removed and cleaned with the vacuum cleaner until no further soil was removed. Typically 5 to 8 passes of the vacuum in two perpendicular directions over the pile were necessary. This completed the first Vetterman drum cycle.

For the second cycle, the carpet samples were returned to the Vetterman drum, together with the BURUNDUM cylinders and 200 g of the dirty nylon pellets from the previous soiling. An additional 100 g of soiled nylon pellets were added to the drum before covering the opening in the face of the Vetterman drum with the PLEXIGLASS cover. The Vetterman drum was then run for an additional 500 revolutions. The BURUNDUM cylinders and the dirty nylon pellets were removed from the drum. The carpet samples were removed and cleaned with the vacuum cleaner as before until no further soil was removed, completing the second cycle.

The above "second" cycle procedure was repeated until a total of 10 soiling cycles, each with 500 Vetterman drum revolutions, were completed. Finally, color differences are evaluated using a Minolta calorimeter and reported as Delta E. Delta E is a measure of soil retention based on the difference in reflectance between soiled and unsoiled carpet. Lower delta E values indicate superior soil resistance and repellency.

Test Method 2: Oil and Water Repellency Tests

The oil repellency test is adapted from AATCC Test Method 118. A piece of carpet is conditioned for a minimum of 2 hours at 23±2° C. and 65±10% relative humidity. Beginning with the lowest numbered test liquid (Repellency Rating No. 1), one drop (approximately 5 mm diameter or 0.05 mL volume) is placed on each of three locations at least 5 mm apart. The drops are observed for 10 seconds for the water-repellency test, 30 seconds for the oil-repellency test. If, at the end of those periods of time, two of the three drops are still spherical to hemispherical in shape with no wicking around the drops, three drops of the next higher numbered test liquid are placed on adjacent sites and observed again for the specified periods of time. The procedure is continued until one of the test liquids results in two of the three drops failing to remain spherical or hemispherical, or wetting or wicking occurs. The oil-repellency rating (OR) and the water-repellency (WR) rating of the carpet is the highest numbered test liquid for which two of three drops remain spherical or hemispherical with no wicking for the specified time.

| STANDARD WATER REPELLENCY TEST LIQUIDS | | |
|---|---|---|
| Water-Repellency Rating # (WR) | Composition (Volume %) | |
| | Isopropanol | Water |
| 1 | 2 | 98 |
| 2 | 5 | 95 |
| 3 | 10 | 90 |
| 4 | 20 | 80 |
| 5 | 30 | 70 |
| 6 | 40 | 60 |

| STANDARD OIL REPELLENCY TEST LIQUIDS | |
|---|---|
| Oil-Repellency Rating # (OR) | Composition |
| 1 | NUJOL* |
| 2 | 65/35 NUJOL/n-hexadecane by volume at 21° C. |
| 3 | n-hexadecane |
| 4 | n-tetradecane |
| 5 | n-dodecane |
| 6 | n-decane |

*NUJOL is a trademark of Plough, Inc., for a mineral oil which has a Saybolt viscosity of 360-390 sec. at 100° F. (0.080-0.085E−03 $m^2$/s at 38° C.) and a specific gravity of 0.880/0.900 at 15° C.

Test Method 3: Stain Testing, 24-Hour Cherry KOOL-AID Staining

Cherry KOOL-AID stain and repellency testing is conducted on carpet samples 15 cm by 15 cm. Acid dye stain resistance was evaluated using a procedure based on the American Association of Textile Chemists and Colorists (AATCC) Method 175-1991, "Stain Resistance: Pile Floor Covering." A staining solution was prepared by mixing water and sugar sweetened cherry KOOL-AID, according to package directions. KOOL-AID is a trademark of Kraft General Foods, Inc. The carpet sample to be tested was placed on a flat non-absorbent surface and a hollow plastic cylinder having a 2-inch (5-cm) diameter was placed tightly over the carpet sample. Twenty ml of staining solution was poured into the cylinder and the solution was allowed to absorb completely into the carpet sample. The cylinder was then removed and the stained carpet sample was allowed to sit undisturbed for 24 hours, after which it was rinsed thoroughly under cold tap water and squeezed dry. The carpet sample was then visually inspected and rated for staining according to AATCC Red 40 Stain Scale. A KOOL-AID stain rating (KA) of 10 is excellent, showing no visible stain, whereas 1 is the poorest rating, comparable to an untreated control sample.

Test Method 4: Mixing Compatibility

The compatibility of the partially fluorinated urethane polymer dispersions of the present invention was tested by mixing them with common carpet chemical treatments (stainblockers or fluorochemical soil resists) in a 1:1 volume ratio and observing any separation or coagulation of the mixture. For each compatibility test, 5 mL of a fluorochemical protectant of the present invention were combined with 5 mL of an anionic stainblocker or fluorochemical soil resist. The combination of chemicals was shaken for 1 minute. Any separation or gelling after 1 hour was recorded. If no visible change in viscosity (gelling) or separation of the mixture was observed after 1 hour, then the compatibility of those two chemicals was judged "OK". Otherwise, the incompatibility was described as "gelled" or "separated". The partially fluorinated urethane polymer dispersions of the present invention are substantially more compatible with such anionic chemicals as is shown in Table 12.

EXAMPLES

In the Examples and Comparative Examples below, the carpet treatment variables for the application of the partially fluorinated urethanes were designed to achieve about 500 to about 700 micrograms of fluorine per gram of carpet fiber pile. Sources of chemicals are as previously listed above.

Example 1

The perfluoroalkylethyl alcohol (FA) used in this example had the formula $F(CF_2)_yCH_2CH_2OH$ wherein y is predominately 6, 8, and 10. A hexamethylene diisocyanate homopolymer (DESMODUR N-100), a perfluoroalkylethyl alcohol mixture (FA) in an amount sufficient to react with 80% of the NCO group charge, and dry MIBK in an amount equal to 22% of the total charge weight were added to a reaction vessel, agitated under nitrogen and heated to 60°-65° C., whereupon a catalytic amount of dibutyltindilaurate was added. After the resultant exotherm, the reaction mixture was agitated at about 80°-85° C. for 2 hours from the time of the catalyst addition, and then treated with wet MIBK in an amount equal to a water ratio of 1.03. The diluted mixture was agitated at about 65° C. for an additional 2 hours.

A solution/mixture of 48 g of MIBK and 52 g of partially fluorinated urethane polymer, prepared as described above, was melted at about 60° C. A warm surfactant solution was prepared by mixing 2.08 g of ARQUAD 2HT-75 and 0.55 g of MERPOL SE with 87.85 g of deionized water. This aqueous surfactant solution was combined with the molten MIBK/partially fluorinated urethane polymer mixture, and the composition emulsified by sonnication. MIBK was removed by vacuum distillation to produce a milky dispersion that was diluted to about 24% solids.

Examples 2-24

The procedure described above for Example 1 was followed to produce Examples 2-24 using the partially fluorinated urethane polymer of Example 1 with different combinations of surfactants. The surfactants used are listed in Table 1.

Comparative Examples C-G

Comparative examples C-G were prepared according to the procedure for Example 1 using the partially fluorinated urethane polymer of Example 1, except that no nonionic surfactant was used.

TABLE 1

Surfactants used in the preparation of Examples 2-23.

| Ex. # | Cationic Surfactant | Amount (g) | Non-ionic Surfactant | Amount (g) |
|---|---|---|---|---|
| 2 | ARQUAD 2HT-75 | 2.08 | BRIJ 58 | 0.52 |
| 3 | ARQUAD 2HT-75 | 2.08 | BRIJ 76 | 0.52 |
| 4 | ARQUAD 2C-75 | 2.08 | BRIJ 35 | 0.52 |
| 5 | ARQUAD 2C-75 | 2.08 | MAPEG | 0.52 |
| 6 | ARMEEN DM18D | 1.56/0.3 | MERPOL HCS | 0.87 |

TABLE 1-continued

Surfactants used in the preparation of Examples 2-23.

| Ex. # | Cationic Surfactant | Amount (g) | Non-ionic Surfactant | Amount (g) |
|---|---|---|---|---|
| 7 | ARMEEN DM18D | 1.56/0.3 | BRIJ 35 | 0.52 |
| 8 | ARMEEN DM18D | 1.56/0.3 | BRIJ 58 | 0.52 |
| 9 | ARMEEN DM18D | 1.56/0.3 | BRIJ 76 | 0.52 |
| 10 | ARQUAD 2C-75 | 2.08 | MAPEG | 0.52 |
| 11 | ARQUAD 2C-75 | 2.08 | BRIJ 58 | 0.52 |
| 12 | ARQUAD 2C-75 | 2.08 | BRIJ 35 | 0.52 |
| 13 | ARQUAD 2HT-75 | 2.08 | BRIJ 58 | 0.52 |
| 14 | ARMEEN DM18D | 1.56/0.3 | BRIJ 58 | 0.52 |
| 15 | ARQUAD 2HT-75 | 2.08 | MERPOL SE | 0.55 |
| 16 | ARMEEN DM12D | 1.56/0.4 | BRIJ 58 | 0.52 |
| 17 | ARQUAD 18-50 | 3.12 | BRIJ 58 | 0.52 |
| 18 | ETHOQUAD C/25 | 1.64 | BRIJ 58 | 0.52 |
| 19 | ARQUAD 2C-75 | 0.69 | MAPEG | 1.56 |
| 20 | ARQUAD 2C-75 | 1.39 | MAPEG | 1.04 |
| 21 | ARQUAD 2C-75 | 2.08 | MAPEG | 0.52 |
| 22 | ARQUAD 2C-75 | 0.69 | MAPEG | 0.52 |
| 23 | ARQUAD 2C-75 | 2.08 | MAPEG | 1.56 |
| 24 | ARQUAD 2C-75 | 5.55 | MAPEG | 4.16 |

Comparative Examples

| | | | |
|---|---|---|---|
| C | ARQUAD 18-50 | 5.20 | NONE |
| D | ARQUAD 2C-75 | 3.47 | NONE |
| E | ARQUAD 2HT-75 | 3.47 | NONE |
| F | ETHOQUAD 18/25 | 2.74 | NONE |
| G | ARMEEN DM18D/HOAc | 2.60/0.50 | NONE |

HOAc is an abbreviation for acetic acid.

Comparative Example A

This example demonstrates a composition containing an anionic surfactant. A solution of partially fluorinated urethane polymer was produced as described in Example 1. This solution was mixed with an aqueous solution of Witco 6094 (available from Witco Chemical Corp., Houston Tex.) with the weight content of the surfactant equaling 6% of the weight of partially fluorinated urethane polymer. An emulsion of this mixture was generated via a homogenizer, and the organic solvent was removed by vacuum distillation to produce a milky dispersion of partially fluorinated urethane polymer in water. This dispersion was diluted to about 24% solids.

Comparative Example B

This example demonstrates a different partially fluorinated urethane polymer composition combined with a cationic and a nonionic surfactant.

Two and one half moles of a mixture of fluoroalcohols of the formula $F(CF_2)_yCH_2CH_2OH$, wherein y is predominantly 6, 8, and 10, were charged to a reaction vessel and under a nitrogen atmosphere heated to 60-70° C. A 60 wt. % solution of one mole of DESMODUR N-3200 in MIBK was added to the fluoroalcohol and the resulting reaction mixture was agitated and allowed to cool to about 60-65° C., at which point a catalytic amount of dibutyltin dilaurate was added. After the resulting exotherm subsided, the reaction mixture was agitated an additional 2 hours at 80-85° C. and one half mole of 3-chloro-1,2-propanediol (as a 47.4% solution in MIBK) was added. The reaction mixture was heated at 65° C. and agitated an additional 12 hours at which time it was diluted to 54 wt. % solids with MIBK. The product was a mixture.

A molten solution/mixture of partially fluorinated urethane polymer, prepared as described above, was washed with a 1.92% aqueous solution of sodium chloride, after which, it was mixed with an aqueous solution of ARQUAD 12-50 and MERPOL HCS (with the weight content of the surfactants equaling 3% and 1%, respectively, of the weight of partially fluorinated urethane polymer). An emulsion of this mixture was generated via a homogenizer, and the organic solvent was removed by vacuum distillation to produce a milky dispersion of partially fluorinated urethane polymer in water. This dispersion was diluted to about 20% solids.

Examples 25-33

A dyed light blue 30 oz./yd$^2$ (1 kg/m$^2$) tufted, cut pile carpet (made from twisted, SUPERBA heatset, 1150 DuPont fiber, from E. I. du Pont de Nemours and Company, Wilmington, Del.) was passed through a flex-nip application of 250% by weight of a bath containing 16 g/L of SR-500 Stain Resist (available from E. I. Du Pont de Nemours and Co. Inc, Wilmington, Del.). The carpet was steamed at 210-212° F. (99-100° C.) for 2.5 min. and washed with water. It was then vacuum extracted to 50% wet pickup, and dried to a carpet face temperature of 300° F. (149° C.).

A 762 cm$^2$ carpet sample was moistened with 10 g of water using a trigger sprayer from WB Bottle Supply Co., Inc., Milwaukee, Wis. The carpet sample was then sprayed using a trigger sprayer with 22 g of a mixture of 2.0 g of the partially fluorinated urethane polymer dispersion (as shown in Tables 2 and 3) and 100 g of water or approximately 25% wet pick up based on the face weight of the carpet. The surface pile of the carpet was rolled with a small roller (7 cm wide) to mechanically spread the partially fluorinated urethane polymer dispersion coating across the entire carpet pile. The carpet sample was dried an oven at 65° C. for 20 minutes then immediately placed in a second oven at 150° C. and cured for 3 minutes. The carpet was cooled and conditioned for at least 4 hours at approximately 22° C. and 75% relative humidity prior to any evaluations. The goal fluorine level was 550 micrograms of fluorine per gram of carpet fiber pile based on the 0.5% application rate of the partially fluorinated urethane polymer dispersion onto the carpet pile, of an emulsion with a fluorine level of 11% by weight. The 0.5% application rate onto the carpet pile is the product of 25% wet pick up of the 2% bath of the partially fluorinated urethane polymer dispersion in water.

Aqueous dispersions of Examples 1-9 were applied to the carpet samples prepared as described above. These samples were tested for repellency, using Test Method 2, versus untreated control carpet samples and carpet samples treated with Comparative Examples A and B. The results of these tests are presented in Tables 2 and 3.

TABLE 2

Comparison of repellency

| Example | Dispersion used | Surfactants | OR | WR |
|---|---|---|---|---|
| 25 | Ex. 1 | ARQUAD 2HT-75/MERPOL SE | 3 | 5 |
| 26 | Ex. 2 | ARQUAD 2HT-75/BRIJ 58 | 3 | 4 |
| 27 | Ex. 3 | ARQUAD 2HT-75/BRIJ 76 | 3 | 4 |
| Comparative Example A | | | 0 | 4 |
| Comparative Example B | | | 1 | 4 |
| Untreated Control | | | 0 | 0 |

OR = Oil Repellency,
WR = Water Repellency, as described in Test Method 2, above.

TABLE 3

Comparison of repellency

| Example | Dispersion used | Surfactants | OR | WR |
|---|---|---|---|---|
| 28 | Ex. 4 | ARQUAD 2C-75/BRIJ 35 | 3 | 4 |
| 29 | Ex. 5 | ARQUAD 2C-75/MAPEG 600MS | 3 | 5 |
| 30 | Ex. 6 | ARMEEN DM18D-HOAc/MERPOL HCS | 4 | 5 |
| 31 | Ex. 7 | ARMEEN DM18D-HOAc/BRIJ 35 | 5 | 5 |
| 32 | Ex. 8 | ARMEEN DM18D-HOAc/BRIJ 58 | 5 | 5 |
| 33 | Ex. 9 | ARMEEN DM18D-HOAc/BRIJ 76 | 4 | 5 |
| Comparative Example A | | | 0 | 3 |
| Comparative Example B | | | 1 | 5 |
| Untreated Control | | | 0 | 0 |

OR = Oil Repellency,
WR = Water Repellency, as described in Test Method 2, above.
HOAc is an abbreviation for acetic acid.

Tables 2 and 3 showed the overall repellency of the examples of the present invention were superior to those of Comparative Examples A and B.

Examples 34-43

Details for the carpet preparation for Example 34 are as follows. DuPont 2615 nylon-6,6 BCF fiber was tufted into a level loop construction of 1020 g/m$^2$ (30 oz/yd$^2$). The carpet was dyed to a beige color using conventional dyes and processes. The dyed carpet was treated with 4% SR-500 stainblocker (from E. I. du Pont de Nemours and Co. Inc., Wilmington, Del.) by weight of carpet fiber from a bath containing 14 g/L of SR-500 at pH 2.0 followed by steaming in a saturated vertical steamer for 90 seconds, rinsing with water, and vacuum drying to approximately 50% wet pick up. The dyed and stainblocker-treated carpet was dried in a gas-fired oven at approximately 140° C. (280° F.). The carpet was cut into 28.6 cm by 26.7 cm sized samples (762 cm2) prior to protectant application. Examples 35-43 were conducted using the above procedure.

The application of the partially fluorinated urethane dispersion was made according to the procedures of Examples 25-33. A 762 cm$^2$ carpet sample was moistened with 10 g of water using a trigger sprayer from WB Bottle Supply Co., Inc., Milwaukee, Wis. The carpet sample was then sprayed using a trigger sprayer with 22 g of a mixture of 2.5 g of the partially fluorinated urethane polymer dispersion (as shown in Tables 2 and 3) and 100 g of water or approximately 25% wet pick up based on the face weight of the carpet. The surface pile of the carpet was rolled with a small roller (7 cm wide) to mechanically spread the partially fluorinated urethane polymer dispersion coating across the entire carpet pile. The carpet sample was dried an oven at 65° C. for 20 minutes then immediately placed in a second oven at 150° C. and cured for 3 minutes. The carpet was cooled and conditioned for at least 4 hours at approximately 22° C. and 75% relative humidity prior to any evaluations.

The calculated fluorine level was 680 micrograms of fluorine per gram of carpet fiber pile based on the 0.62% application rate of the partially fluorinated urethane polymer dispersion onto the carpet pile, of an emulsion with a fluorine level of 11% by weight. The 0.62% application rate onto the carpet pile is the product of 25% wet pick up of the 2.5% bath of the partially fluorinated urethane polymer dispersion in water.

Aqueous dispersions of examples 10-18 were applied to stain-resistant (previously treated with 4% SR-500, available from E. I. du Pont de Nemours and Co. Inc., Wilmington, Del.) 2615 level loop dyed first light carpet samples by procedures described above. These samples were tested for their resistance to soiling using Test Method 1 versus a carpet sample treated with Comparative Example B. Example 43 represents a similar test versus Comparative Example A. The results of these tests are presented in Table 4.

TABLE 4

Comparison of resistance to soiling

| Example | Dispersion Used | Surfactants | Delta E |
|---|---|---|---|
| 34 | Ex. 10 | ARQUAD 2C-75/MAPEG 600MS | 15.7 |
| 35 | Ex. 11 | ARQUAD 2C-75/BRIJ 58 | 15.5 |
| 36 | Ex. 12 | ARQUAD 2C-75/BRIJ 35 | 15.3 |
| 37 | Ex. 13 | ARQUAD 2HT-75/BRIJ 58 | 14.7 |
| 38 | Ex. 14 | ARMEEN DM18D-HOAc/BRIJ 58 | 16.4 |
| 39 | Ex. 15 | ARQUAD 2HT-75/MERPOL SE | 16.1 |
| 40 | Ex. 16 | ARMEEN DM12D-HOAc/BRIJ 58 | 15.3 |
| 41 | Ex. 17 | ARQUAD 18-50/BRIJ 58 | 16.8 |
| 42 | Ex. 18 | ETHOQUAD C/25/BRIJ 58 | 16.0 |
| Comparative Example B | | | 22.7 |
| 43 | Ex. 13 | ARQUAD 2HT-75/BRIJ 58 | 16.1 |
| Comparative Example A | | | 16.4 |

Delta E is a measure of soil retention as described in Test Method 1 above, where lower values indicate superior soil resistance and repellency.
HOAc is an abbreviation for acetic acid.

The soil-resistance imparted by the compositions of the present invention was superior to that imparted by Comparative Examples A and B.

Examples 44-47

Aqueous dispersions of examples 10, 13, and 15 were applied to stain-resistant (previously treated with 4% SR-500) 2615 level loop dyed first light carpet samples by procedures described above in Examples 39-48. These samples were tested for their repellency (using Test Method 2) and resistance to staining (using Test Method 3) versus a carpet sample treated with Comparative Example B. Example 47 represents repellency tests versus Comparative Example A. The results of these tests are presented in Table 5.

TABLE 5

Comparison of repellency and resistance to staining

| Ex. # | Dispersion Used | Surfactants | OR | WR | KA | Tip Stain |
|---|---|---|---|---|---|---|
| 44 | Ex. 10 | ARQUAD 2C-75/MAPEG 600MS | 6 | 6 | 10 | No |
| 45 | Ex. 13 | ARQUAD 2HT-75/BRIJ 58 | 6 | 6 | 10 | No |
| 46 | Ex. 15 | ARQUAD 2HT-75/MERPOL SE | 6 | 6 | 9.5 | No |
| Comparative Example B | | | 5 | 6 | 8 | Yes |
| 47 | Ex. 13 | ARQUAD 2HT-75/BRIJ 58 | 6 | 6 | NT | NT |
| Comparative Example A | | | 3 | 4 | NT | NT |

OR = Oil Repellency,
WR = Water Repellency, as described in Test Method 2, above.
KA indicates the KOOL-AID Stain Rating, as described in Test Method 3, above.
Tip staining is a carpet mill problem described in the Background Section, above, and is assessed as present or absent by visual examination.
NT: not tested.

Table 5 showed that the examples of the present invention showed excellent repellency and superior stain resistance (including no tip staining) when compared to Comparative Example B, and superior repellency when compared to Comparative Example A.

Examples 48-53

Aqueous dispersions of examples 19-24 were applied to stain-resistant (previously treated with 4% SR-500, available from E. I. du Pont de Nemours and Co., Inc., Wilmington, Del.) 2615 level loop dyed first light carpet samples by procedures described above in Examples 34-43. These samples were tested for their repellency (using Test Method 2), resistance to staining (using Test Method 3), and soil-resistance (using Test Method 1) versus a carpet sample treated with Comparative Example A. The results of these tests are presented in Table 6.

TABLE 6

Comparison of repellency, resistance to staining, and soil-resistance

| Ex. # | Dispersion Used | Surfactants | OR | WR | KA | Delta E |
|---|---|---|---|---|---|---|
| 48 | Ex. 19 | ARQUAD 2C-75/MAPEG 600MS | 6 | 6 | 5 | 16.7 |
| 49 | Ex. 20 | ARQUAD 2C-75/MAPEG 600MS | 6 | 6 | 6 | 16.4 |
| 50 | Ex. 21 | ARQUAD 2C-75/MAPEG 600MS | 5 | 6 | 6 | 15.4 |
| 51 | Ex. 22 | ARQUAD 2C-75/MAPEG 600MS | 6 | 5 | 6 | 15.0 |
| 52 | Ex. 23 | ARQUAD 2C-75/MAPEG 600MS | 6 | 5 | 5 | 15.1 |
| 53 | Ex. 24 | ARQUAD 2C-75/MAPEG 600MS | 6 | 6 | 2 | 16.0 |
| Comparative Example A | | | 2 | 4 | 4 | 17.2 |

OR = Oil Repellency,
WR = Water Repellency, as described in Test Method 2, above.
KA indicates the KOOL-AID Stain Rating, as described in Test Method 3, above.
Delta E is a measure of soil retention as described in Test Method 1 above, where lower values indicate superior soil resistance and repellency.

Table 6 demonstrates that the examples of the present invention, over a range of cationic and non-ionic surfactant levels, had superior repellency, stain-resistance, and soil-resistance to those imparted by Comparative Example A.

Comparative Examples H-L

Aqueous dispersions of Comparative Examples H-L were applied to 1150 light blue, cut pile, stain-resistant (previously treated with 4% SR-500, available from E. I. du Pont de Nemours and Co., Inc., Wilmington, Del.) carpet samples by procedures described above in Examples 25-33. These samples were tested for their repellency (using Test Method 2) and resistance to staining (using Test Method 3) versus carpet samples treated with Comparative Example A and B. The results of these tests are presented in Table 7.

TABLE 7

Comparison of repellency, resistance to staining, and soil-resistance

| Comp. Example | Dispersion Used | Surfactant | OR | WR | KA | Tip Stain |
|---|---|---|---|---|---|---|
| H | Ex. C | ARQUAD 18-50 | 1 | 5 | 6 | Yes |
| I | Ex. D | ARQUAD 2C-75 | 3 | 6 | 5 | Yes |
| J | Ex. E | ARQUAD 2HT-75 | 3 | 6 | 7 | Yes |

TABLE 7-continued

Comparison of repellency, resistance to staining, and soil-resistance

| Comp. Example | Dispersion Used | Surfactant | OR | WR | KA | Tip Stain |
|---|---|---|---|---|---|---|
| K | Ex. F | ETHOQUAD 18/25 | 2 | 4 | 5 | Yes |
| L | Ex. G | ARMEEN DM18D/HOAc | 3 | 5 | 6 | Yes |
| Comparative Example A | | | 0 | 3 | 9 | No |
| Comparative Example B | | | 3 | 6 | 6 | Yes |

OR = Oil Repellency,
WR = Water Repellency, as described in Test Method 2, above.
KA indicates the KOOL-AID Stain Rating, as described in Test Method 3, above.
Tip staining is a carpet mill problem described in the Background Section, above, and is assessed as present or absent by visual examination.
HOAc is an abbreviation for acetic acid.

Table 7 demonstrates that the repellency and stain-resistance of Comparative Examples H-L, dispersed with only cationic surfactants, were comparable to those of Comparative Example B containing a partially fluorinated urethane polymer outside of the present invention. Compared to Comparative Example A containing an anionic surfactant, superior repellency was off-set by poorer stain-resistance. Thus, both the partially fluorinated urethane polymer and the cationic/nonionic surfactant system of the present invention are important to obtain suprior repellency.

Example 54

A solution/mixture of 192 grams of MIBK and 208 grams of partially fluorinated urethane polymer described in Example 1 was melted at about 60° C. A warm surfactant solution was prepared by mixing 8.32 grams of ARQUAD 2C-75 and 2.08 grams of MAPEG 600MS with 351.52 grams of deionized water. This aqueous surfactant solution was combined with the molten MIBK/partially fluorinated urethane polymer mixture. This composition was then mixed in a blender and emulsified via a homogenizer. MIBK was removed by vacuum distillation to produce a milky dispersion that was diluted to 24% solids.

Examples 55-64

The procedures described above for Example 54 was followed to produce Examples 55-64 using different combinations of surfactants. The surfactants used are listed in Table 8.

TABLE 8

Surfactants used in the preparation of Examples 55-64.

| Ex. # | Cationic Surfactant | Amount (g) | Non-ionic Surfactant | Amount (g) |
|---|---|---|---|---|
| 55 | ARQUAD 2HT-75 | 8.32 | MERPOL SE | 2.19 |
| 56 | ARQUAD 2HT-75 | 8.32 | BRIJ 58 | 2.08 |
| 57 | ARQUAD 2C-75 | 13.87 | MAPEG | 4.16 |
| 58 | ARQUAD 2C-75 | 13.87 | MAPEG | 1.04 |
| 59 | ARQUAD 2C-75 | 5.55 | MAPEG | 4.16 |
| 60 | ARQUAD 2C-75 | 5.55 | MAPEG | 1.04 |
| 61 | ARQUAD 2HT-75 | 13.87 | BRIJ 58 | 4.16 |
| 62 | ARQUAD 2HT-75 | 13.87 | BRIJ 58 | 1.04 |
| 63 | ARQUAD 2HT-75 | 5.55 | BRIJ 58 | 4.16 |
| 64 | ARQUAD 2HT-75 | 5.55 | BRIJ 58 | 1.04 |

Examples 65-67

Aqueous dispersions of examples 54-56 were applied to stain-resistant (previously treated with 4% SR-500, available from E. I. du Pont de Nemours and Co., Inc., Wilmington, Del.) 2615 level loop dyed first light carpet samples by procedures described above in Examples 34-43. These samples were tested for their resistance to staining (using Test Method 3) versus a carpet sample treated with Comparative Example B. The results of these tests are presented in Table 9.

TABLE 9

Comparison of resistance to staining

| Example | Dispersion Used | Surfactants | KA |
|---|---|---|---|
| 65 | Ex. 54 | ARQUAD 2C-75/MAPEG 600MS | 8 |
| 66 | Ex. 55 | ARQUAD 2HT-75/MERPOL SE | 8 |
| 67 | Ex. 56 | ARQUAD 2HT-75/BRIJ 58 | 8 |
| Comparative Example B | | | 7 |

KA indicates the KOOL-AID Stain Rating, as described in Test Method 3, above.

Table 9 demonstrates that the compositions of the present invention showed superior stain resistance when compared to Comparative Example B.

Examples 68-72

Aqueous dispersions of examples 54 and 57-60 were applied to stain-resistant (previously treated with 4% SR-500, available from E. I. du Pont de Nemours and Co., Inc., Wilmington, Del.) 2615 level loop dyed first light carpet samples by procedures described above in Examples 34-43. These samples were tested for resistance to soiling (using Test Method 1) versus a carpet sample treated with Comparative Examples A. The results of these tests are presented in Table 10.

TABLE 10

Comparison of repellency

| Example | Dispersion used | Surfactants | Delta E |
|---|---|---|---|
| 68 | Ex. 54 | ARQUAD 2HT-75/BRIJ 58 | 16.75 |
| 69 | Ex. 57 | ARQUAD 2HT-75/BRIJ 58 | 16.95 |
| 70 | Ex. 58 | ARQUAD 2HT-75/BRIJ 58 | 16.90 |
| 71 | Ex. 59 | ARQUAD 2HT-75/BRIJ 58 | 16.01 |
| 72 | Ex. 60 | ARQUAD 2HT-75/BRIJ 58 | 15.87 |
| Comparative Example A | | | 18.77 |

Delta E is a measure of soil retention as described in Test Method 1 above, where lower values indicate superior soil resistance and repellency.

Table 10 demonstrates that the compositions of the present invention showed superior soil resistance when compared to Comparative Example A.

Examples 73-77

Aqueous dispersions of examples 56 and 61-64 were applied to stain-resistant (previously treated with 4% SR-500, available from E. I. du Pont de Nemours and Co., Inc., Wilmington, Del.) 2615 level loop dyed first light carpet samples by procedures described above in Examples 34-43. These samples were tested for repellency (using Test Method 2) versus a carpet sample treated with Comparative Examples A. The results of these tests are presented in Table 11.

TABLE 11

Comparison of Repellency

| Example | Dispersion used | Surfactants | OR | WR |
|---|---|---|---|---|
| 73 | Ex. 56 | ARQUAD 2HT-75/BRIJ 58 | 6 | 6 |
| 74 | Ex. 61 | ARQUAD 2HT-75/BRIJ 58 | 6 | 5 |
| 75 | Ex. 62 | ARQUAD 2HT-75/BRIJ 58 | 6 | 5 |
| 76 | Ex. 63 | ARQUAD 2HT-75/BRIJ 58 | 6 | 5 |
| 77 | Ex. 64 | ARQUAD 2HT-75/BRIJ 58 | 5 | 4 |
| Comparative Example A | | | 0 | 3 |

OR = Oil Repellency,
WR = Water Repellency, as described in Test Method 2, above.

Table 11 demonstrates that the compositions of the present invention showed significantly superior repellency when compared to Comparative Example A.

Example 78

The compatibility of the partially fluorinated urethane polymer dispersions of the present invention was tested as described in Test Method 4, above. The results are shown in Table 12.

TABLE 12

Compatibility Testing

| | Commercial Anionic Protectants | | |
|---|---|---|---|
| Example # | DuPont N-119 | DuPont N140 | DuPont SR-500 |
| DISPERSION OF THE PRIOR ART | | | |
| Comparative Example B | Separated | Gelled | Separated |
| DISPERSIONS OF THE PRESENT INVENTION | | | |
| Example 21 | OK | OK | OK |
| Example 22 | OK | OK | OK |

Table 12 shows the incompatibility of commercial anionic protectans and Comparative Example B (a cationic dispersion of the prior art). The same commercial anionic protectants were compatible Examples 21 and 22 of the present invention.

Example 79-80

A dyed light tan 30 oz./yd² (1 kg/m²) tufted, level loop pile carpet (made from twisted, SUPERBA heatset, 2615 DuPont fiber, from E. I. du Pont de Nemours and Company, Wilmington, Del.) was passed through a flex-nip application of 250% by weight of a bath containing 16 g/L of SR-500 Stain Resist (available from E. I. du Pont de Nemours and Co. Inc., Wilmington, Del.). The carpet was steamed at 210-212° F. (99-100° C.) for 2.5 min. and washed with water. It was then vacuum extracted to 50% wet pickup, and dried to a carpet face temperature of 300° F. (149° C.).

The carpet sample was then sprayed using a trigger sprayer with 22 g of a mixture of 0.45 g of the partially fluorinated urethane polymer dispersion prepared according to the procedure of Example 56 and 100 g of water or approximately 22% wet pick up based on the face weight of the carpet. The surface pile of the carpet was rolled with a small roller (7 cm wide) to mechanically spread the partially fluorinated urethane polymer dispersion coating across the entire carpet pile. The carpet sample was dried an oven at 65° C. for 20 minutes then immediately placed in a second oven at 150° C. and cured for 3 minutes. The carpet was cooled and conditioned for at least 4 hours at approximately 22° C. and 75% relative humidity prior to any evaluations.

The goal fluorine level was 105 micrograms/gram based on the 0.1% application rate of the partially fluorinated urethane polymer dispersion onto the carpet pile, an emulsion with a fluorine level of 10.5% by weight. The 0.1% application rate of partially fluorinated urethane polymer dispersion onto the carpet pile was calculated as the product of 22% wet pick up of the 0.45% application bath of the dispersion in water. The carpet fiber from this treated sample was analyzed according to AATCC test method 189 and showed 130 micrograms/gram fluorine on the carpet fiber with an accuracy of +/−80 micrograms/gram fluorine. These samples were tested for oil and water repellency and soil resistance using Test Methods 1 and 2. The results are shown in Table 13.

TABLE 13

Performance Versus Prior Art at Lower Treatment Levels

| Ex. # | Dispersion used | Surfactants | OR | WR | Delta E | Goal F* | F found* |
|---|---|---|---|---|---|---|---|
| 79 | Ex. 56 | ARQUAD 2HT-75/BRIJ 58 | 4 | 4 | 16.8 | 100 | 132 |
| 80 | Ex. 13 | ARQUAD 2HT-75/BRIJ 58 | 4 | 4 | 16.4 | 100 | 152 |
| Comparative Example A | | | 3 | 4 | 16.4 | 600 | 654 |
| Untreated Control | | | 0 | 0 | 20.7 | 0 | 29 |

*Expressed as micrograms per gram of dry fiber.
OR = Oil Repellency,
WR = Water Repellency, as described in Test Method 2, above.
Delta E is a measure of soil retention as described in Test Method 1 above, where lower values indicate superior soil resistance and repellency.

Table 13 shows that carpet samples treated with significantly lower quantities of the dispersions of the present invention displayed repellency and soil-resistance equivalent to, if not better than, that provided by a much greater quantity of the prior art (Comparative Example A). Even at these reduced levels of application, dramatic improvements in performance over the untreated control was imparted.

What is claimed is:

1. A nylon substrate treated with 1) aqueous dispersion consisting essentially of
   A. a partially fluorinated urethane polymer having at least one urea linkage, which compound is the product of the reaction of: (1) at least one organic polyisocyanate containing at least three isocyanate groups; (2) at least one fluorochemical compound which contains per molecule (a) a single functional group having one or more Zerewitinoff hydrogen atoms and (b) at least two carbon atoms, each of which is attached to at least two fluorine atoms; and (3) water in an amount sufficient to react with from about 5% to about 60% of the isocyanate groups in said polyisocyanate;
   B. a non-fluorinated cationic surfactant selected from the group consisting of salts of protonated amines, quaternary ammonium salts, and amine oxides; and
   C. a non-fluorinated nonionic surfactant which is a condensate with ethylene oxide of at least one of a fatty acid alkanol amide, an alkyl phenol, a fatty acid, a fatty alcohol, an ester of a fatty acid and polyhydric alcohol, and a polyoxypropylene block copolymer,
   in combination with 2) at least one anionic stain resist, said dispersion providing oil and water repellency upon application to the nylon substrate without causing tip staining.

2. The substrate of claim 1 which is a carpet.

3. The substrate of claim 1 having a coating on the surface thereof containing from about 100 micrograms to about 2000 micrograms fluorine per gram of dry substrate fiber.

4. The substrate of claim 1 wherein the cationic surfactant is selected from the group consisting of at least one of a protonated alkyl dimethyl amine salt, protonated dialkyl methyl amine salt, protonated alkyl ethoxylated amine salt, protonated alkyl diamine salt, protonated alkyl ethoxylated diamine salt, alkyl trimethyl ammonium salt, dialkyl dimethyl ammonium salt, alkyl methyl ethoxylated ammonium salt, alkyl dimethyl benzyl ammonium salt, dialkyl methyl benzyl ammonium salt, alkyl pyridinium salt, alkylamidomethyl pyridinium salt, carboalkoxy pyridinium salt, alkyl quinolinium salt, alkyl isoquinolinium salt, N,N-alkyl methyl pyrollidinium salt, amidoimidazolium salt, amido ammonium salt, quaternary ammonium salt of alkyl diamine, ethoxylate of a quaternary ammonium salt of alkyl diamine, alkyl dimethyl amine oxide, dialkyl methyl amine oxide, and alkyl diamine oxide.

5. The substrate of claim 1 wherein the nonionic surfactant is of the formula A $$C_xH_{(2x+1)}O-(CH_2CH_2O)_n-H \qquad A$$

wherein x is 12 to 18 and n is 5 to 100.

6. The substrate of claim 1 wherein the fluorochemical compound which contains a single functional group is represented by the formula:

$$R^f-(CH_2)_q-X-H$$

in which
R$^f$ is a mixture of perfluoroalkyl groups, $CF_3CF_2(CF_2)_r$ in which r is 2 to 18; and
q is 1, 2 or 3.

7. The substrate of claim 1 wherein said fluorochemical compound which contains a single functional group is represented by the formula:

$$R^f-R_k-R^2-X'-H$$

wherein
R$^f$ is a monovalent aliphatic group containing at least two carbon atoms each of which is attached to at least two fluorine atoms;
R is the divalent radical: $-C_mH_{2m}SO-, -C_mH_{2m}SO_2-, -SO_2N(R^3)-$, or $-CON(R_3)-$ in which m is 1 to 22 and R$^3$ is H or alkyl of 1 to 6 carbon atoms;
k is 0 or 1;
R$^2$ is the divalent linear hydrocarbon radical: $-C_nH_{2n}-$ which can be optionally end-capped by

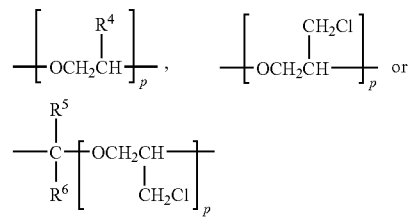

n is 0 to 12, p is 1 to 50, and R$^4$, R$^5$ and R$^6$ are the same or different H or alkyl containing 1 to 6 carbon atoms; and
X' is $-O-, -S-$, or $-N(R^7)-$ in which R$^7$ is H, alkyl containing 1 to 6 carbon atoms or a $R^{f-R}{}_k-R^2$–group.

8. The substrate of claim 1 wherein the aqueous dispersion additionally comprises a non-fluorinated organic compound represented by the formula:

$$R^{10}(R^{11})_k-YH$$

wherein
R$^{10}$ is a $C_1$-$C_{18}$ alkyl, a $C_1$-$C_{18}$ omega-alkenyl radical or a $C_1$-$C_{18}$ omega-alkenoyl;
R$^{11}$ is

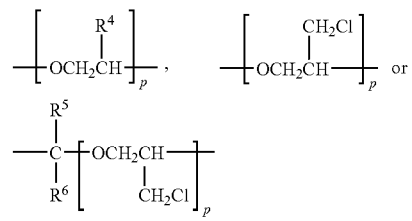

R$^4$, R$^5$ and R$^6$ are the same or different H or alkyl radical containing 1 to 6 carbon atoms and p is 1 to 50;
k is 0 or 1; and
Y is $-O-, -S-$, or $-N(R^3)-$ in which R$^3$ is H or alkyl containing 1 to 6 carbon atoms.

* * * * *

UNITED STATES PATENT AND TRADEMARK OFFICE
CERTIFICATE OF CORRECTION

PATENT NO. : 7,592,064 B2  Page 1 of 1
APPLICATION NO. : 10/913914
DATED : September 22, 2009
INVENTOR(S) : Fitzgerald et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1040 days.

Signed and Sealed this

Twenty-first Day of September, 2010

David J. Kappos
*Director of the United States Patent and Trademark Office*